July 25, 1939.  A. SCHMIDT  2,167,006
SOLDERING MACHINE
Filed July 16, 1937  8 Sheets-Sheet 1
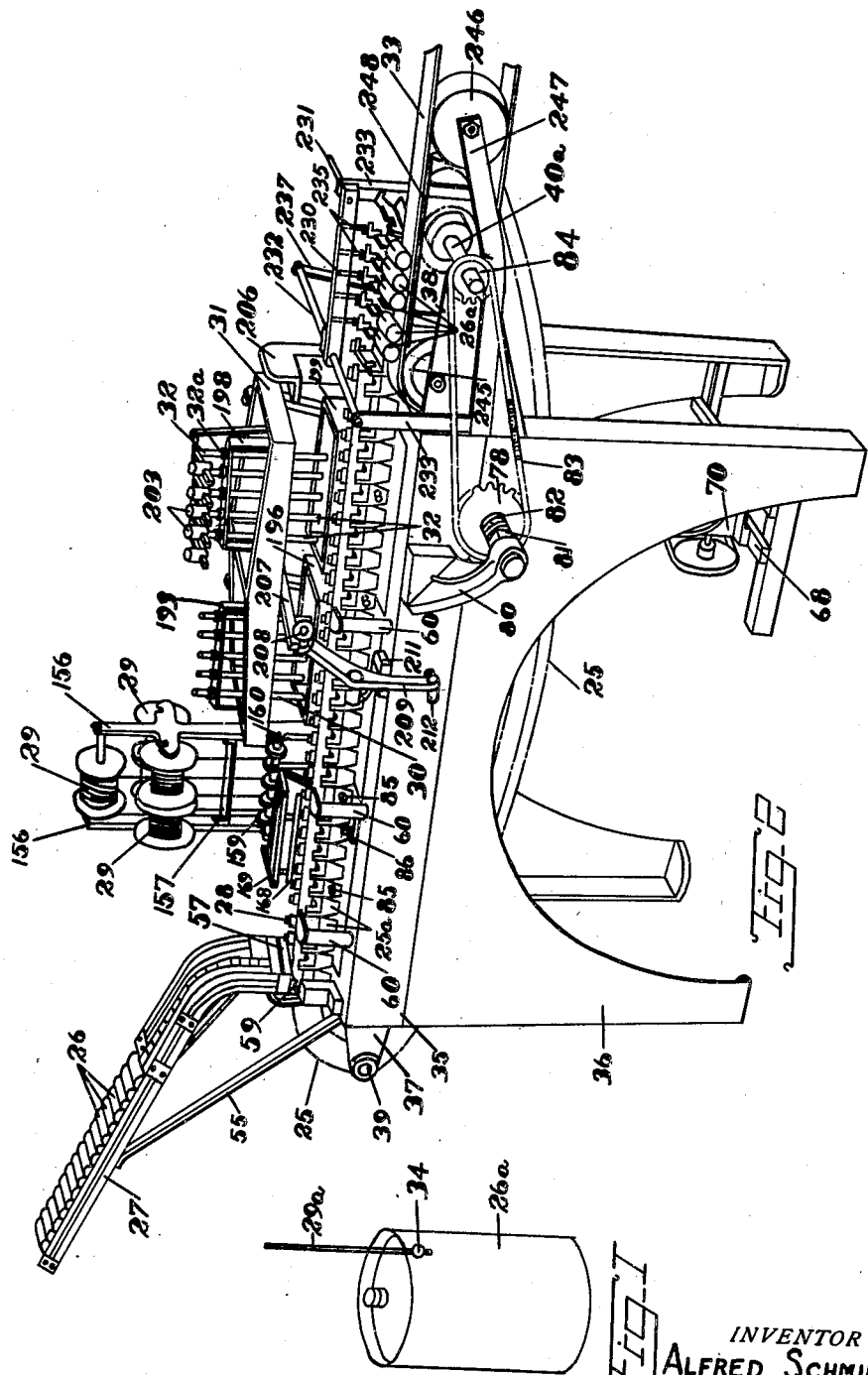
INVENTOR
ALFRED SCHMIDT
ATTORNEY

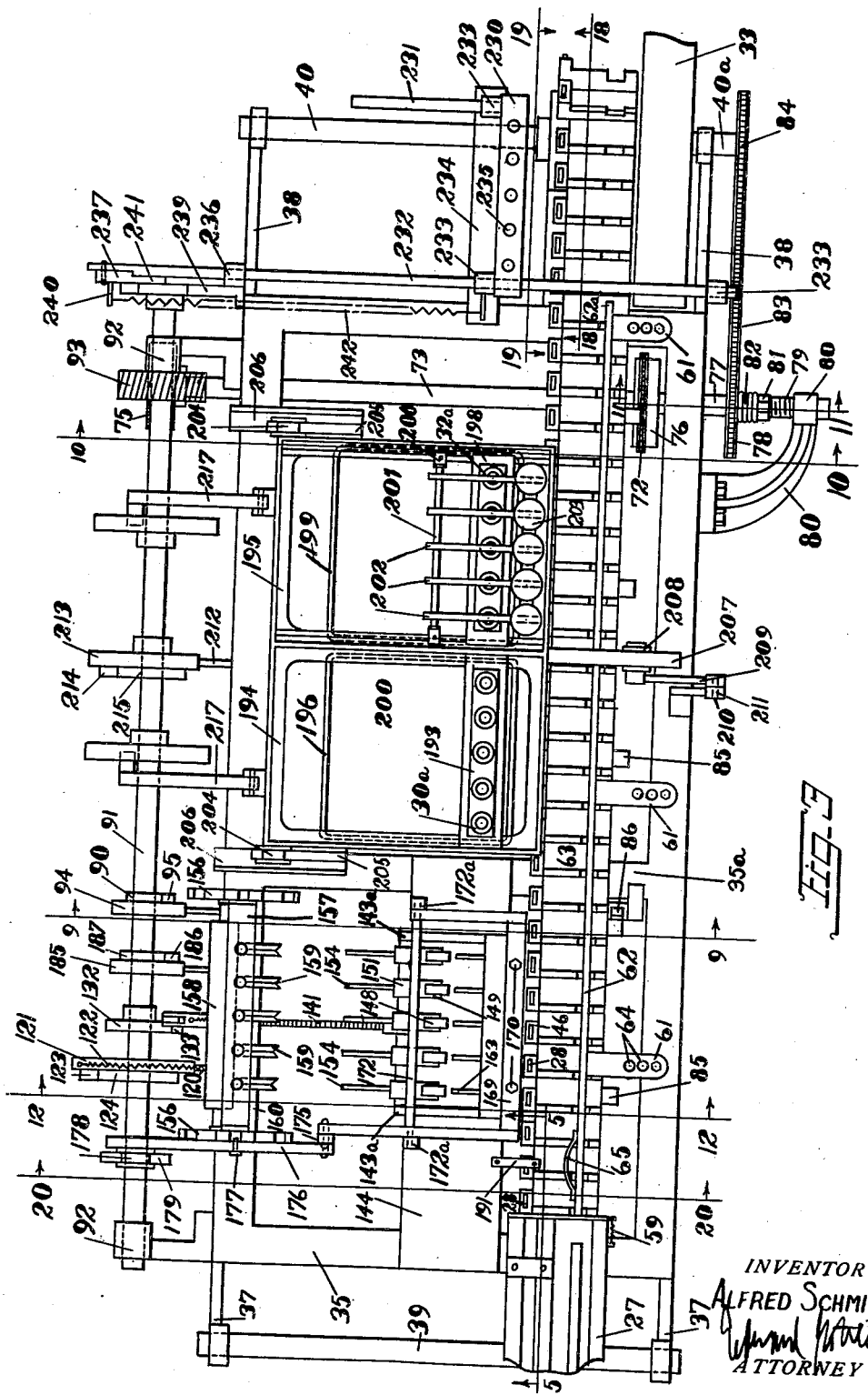

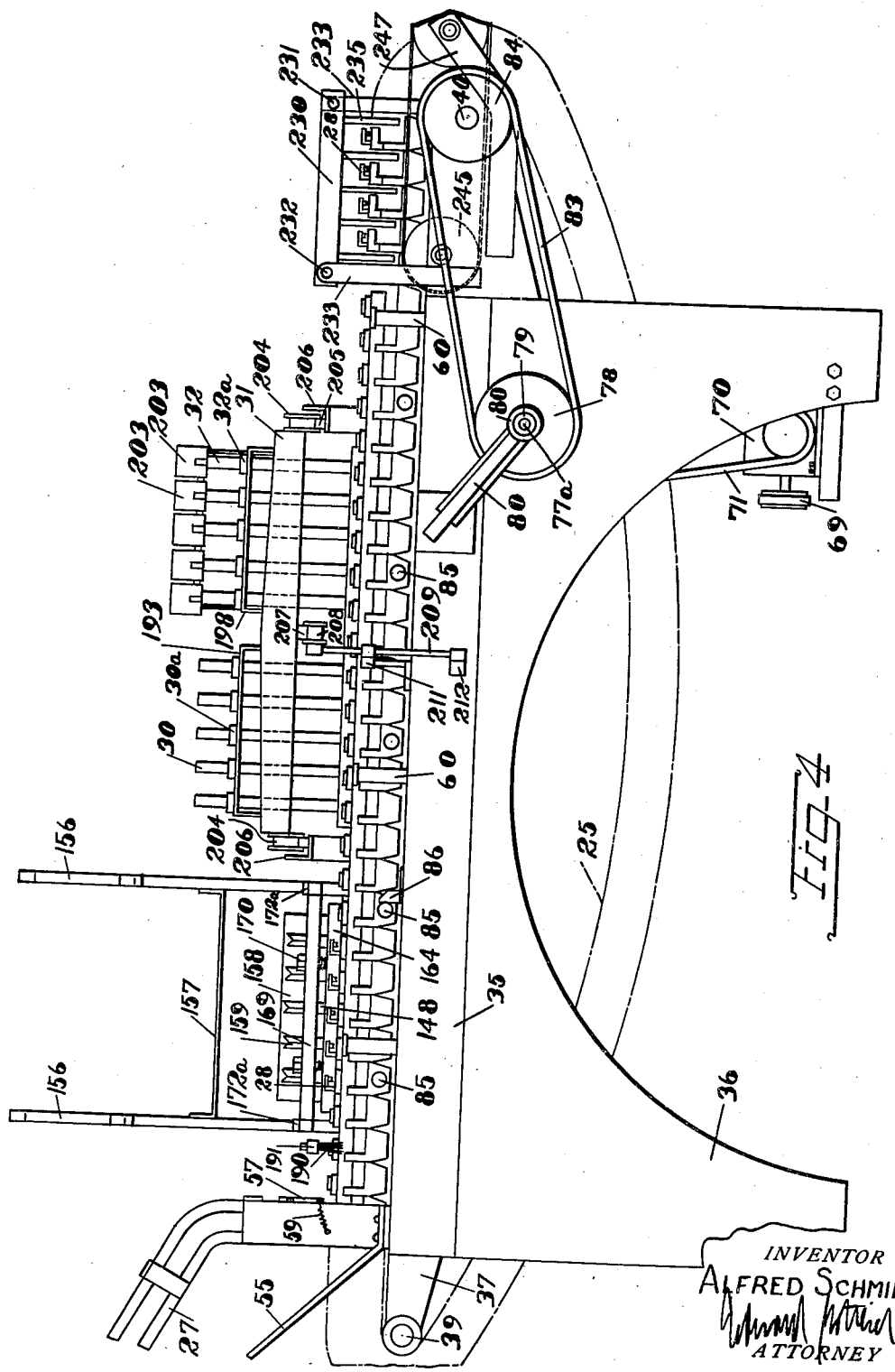

July 25, 1939.    A. SCHMIDT    2,167,006
SOLDERING MACHINE
Filed July 16, 1937    8 Sheets-Sheet 4
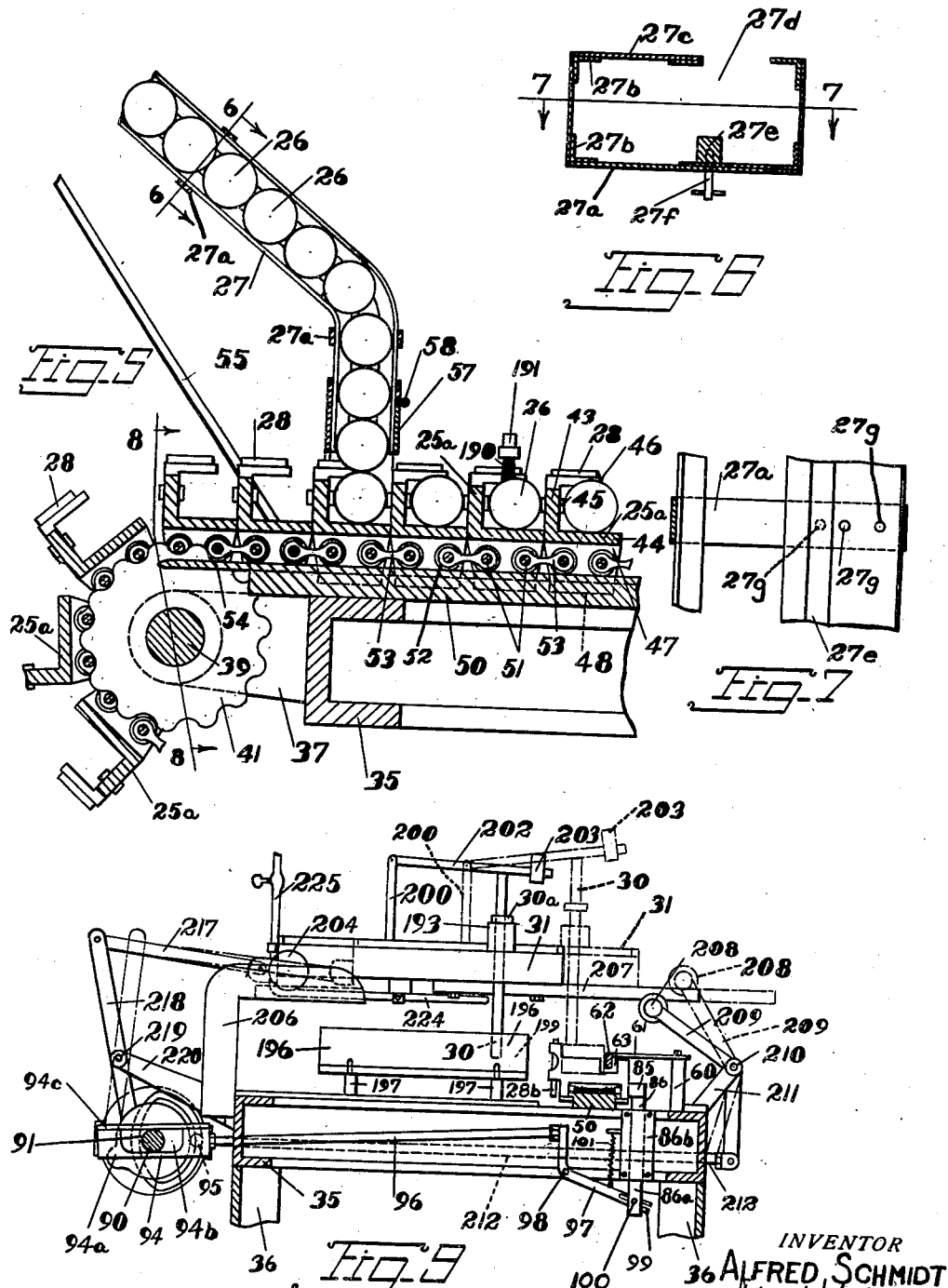

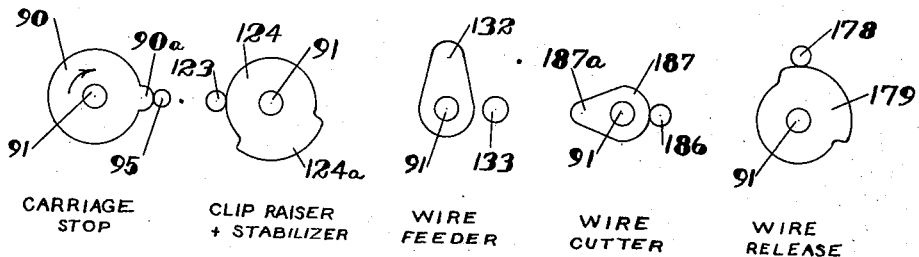
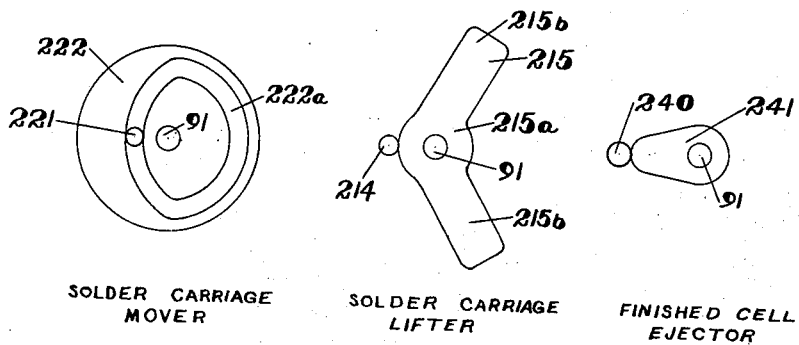
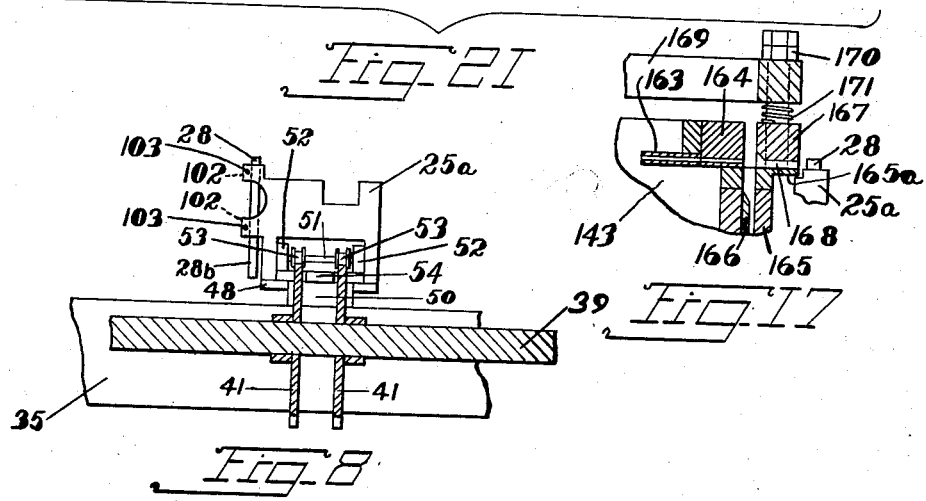

INVENTOR
ALFRED SCHMIDT
ATTORNEY

July 25, 1939.  A. SCHMIDT  2,167,006
SOLDERING MACHINE
Filed July 16, 1937  8 Sheets-Sheet 7
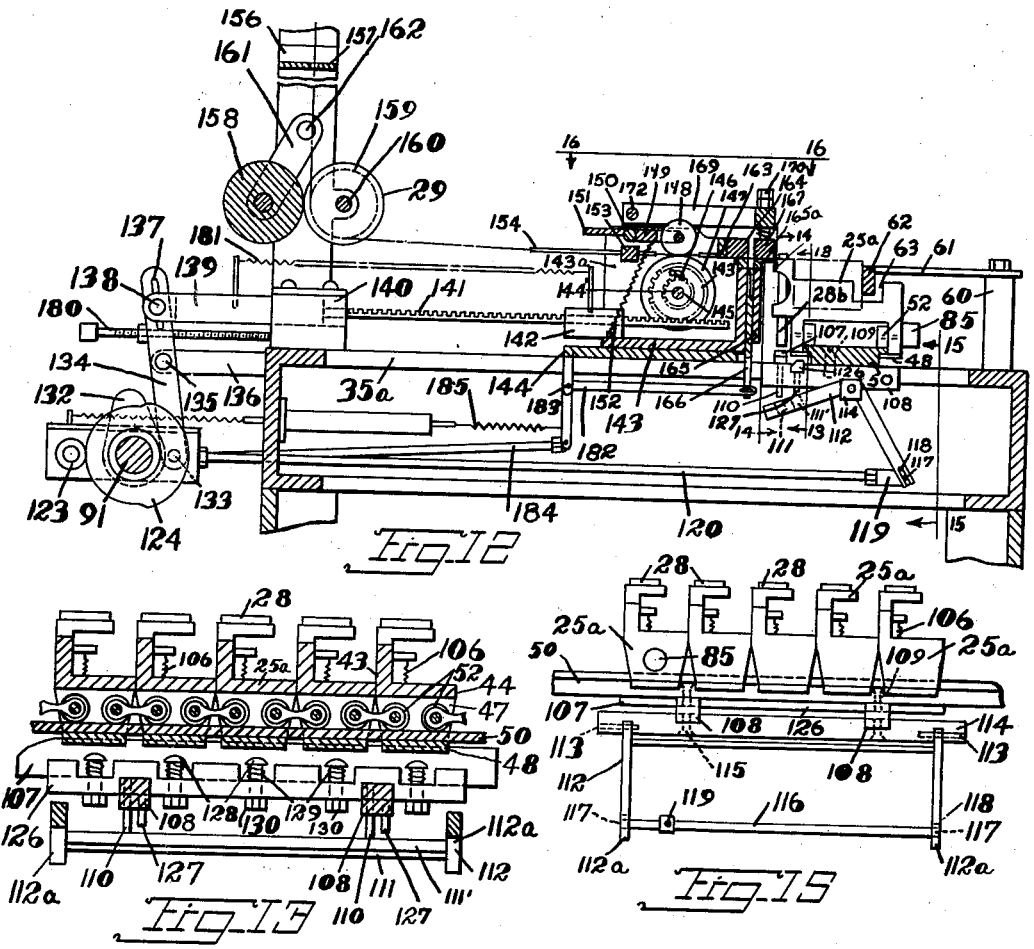
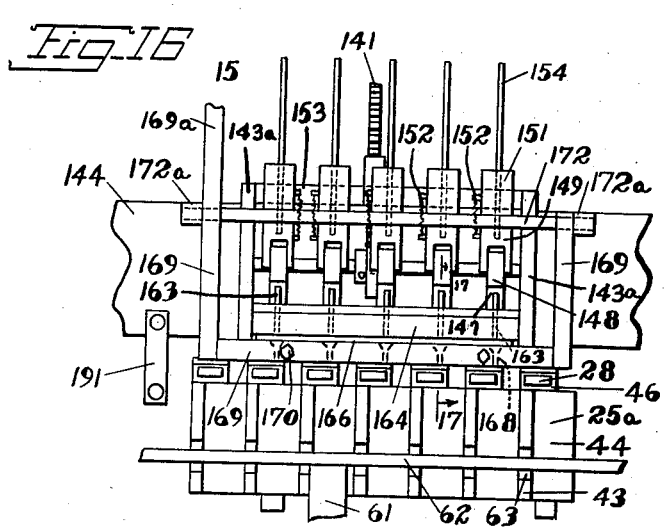
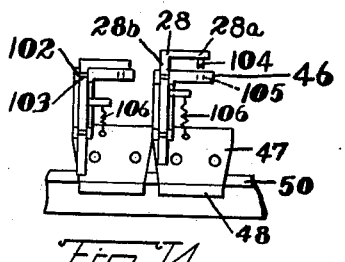
INVENTOR
ALFRED SCHMIDT
ATTORNEY

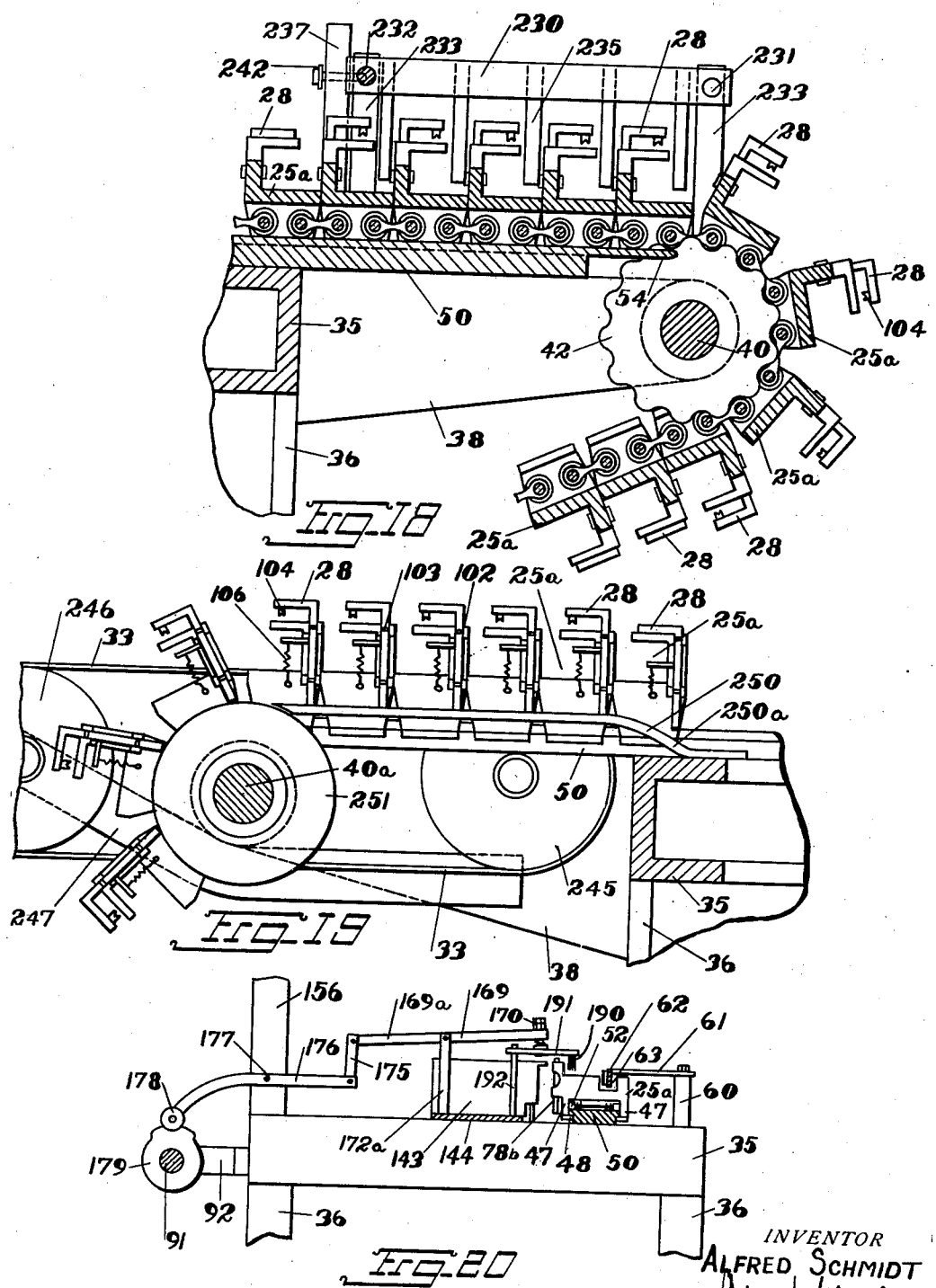

Patented July 25, 1939

2,167,006

UNITED STATES PATENT OFFICE 2,167,006

SOLDERING MACHINE

Alfred Schmidt, Weehawken, N. J.

Application July 16, 1937, Serial No. 153,917

10 Claims. (Cl. 113—59)

This invention relates to new and useful improvements in a soldering machine, and has more particular reference to a soldering machine for soldering a small length of conductor wire to the single shell of a battery cell.

It is an object of this invention to characterize the soldering machine by the fact that it has a flexible endless conveyor for holding battery cells or the like, to which a plurality of conductor wire clamps are associated in a manner so that a conductor wire for each of the cells is held against the cell throughout the soldering and subsequent cooling period of the operation of the machine.

Heretofore machines have been made which were capable of soldering conductor wires to battery cells, but the wires and cells were required to maintain their soldering positions until the solder became cool. Necessarily, this slows down the operation of the machine, or conversely, if the machine operates too rapidly the solder is not given a sufficient time to cool and consequently the conductor wires fall off from the shells. The provision of clamps on the flexible conveyor permits the battery cells with the soldered conductor wires to be moved away from the soldering positions while the solder is still soft since the wires and cells are relatively held fixed and there is ample opportunity for the solder to cool and harden in other positions than that in which the solder was applied. Consequently, it is possible to operate a machine embodying this principle at a greater speed.

Furthermore, the invention proposes to arrange the machine in such a manner that it is capable of treating a plurality of cells at one time. For example, it may treat 5 cells. Specifically, it is proposed that the machine supply proper lengths of conductor wires to the 5 cells, and then solder the conductor wires in position upon the 5 cells, and repeat the operation for a new group of 5 cells. In this manner the speed of the soldering machine is increased without increasing the actual speed of operation of individual parts. Merely more cells are being handled at one time.

The invention further proposes the association in a soldering machine as mentioned of a means for causing the flexible endless conveyor to progressively move forwards in steps of a pre-determined number of cells arranged in a manner to automatically realign the endless conveyor into proper timing position if accidentally the conveyor is forced out of time. For example, should some part become jammed in the machine and the machine caused to be stopped, the conveyor may have been forced out of correct timing position. But with the arrangement, according to this invention, merely upon starting of the machine the conveyor will first seek its proper position before the other parts of the machine go into operation.

A further object of the invention resides in the provision in a soldering machine as mentioned of a means for opening the wire clamps along a predetermined section of the conveyor, particularly at a wire feeding position so that the conductor wires may be fed to the clamps.

Furthermore, the invention proposes the provision in a soldering machine of means for feeding the conductor wires through the open clamps to positions adjacent the battery cells so that subsequently, upon closing of the clamps the conductor wires will be held in proper positions for being soldered.

Still further the invention proposes the provision in a soldering machine as mentioned of rolls of conductor wires for the supplying of conductor wires to the battery cells, and the provision of a means for cutting the clamping conductor wires free from the rolls so that the machine may then proceed to solder on the cut pieces of conductor wires to the cells.

Another one of the objects of this invention resides in the provision of a container for flux and a container for molten solder, and an arrangement for picking up drops of the flux and solder and dropping them in proper positions on the battery cells and conductor wires which are to be soldered. It is proposed to so arrange the timing of the parts that the flux is first applied for insuring a good solder connection.

The invention also proposes the provision in a soldering machine as described of a means for opening the clamps on the endless conveyor after the solder has become cool and hard so that the finished cells may be ejected from the machine.

Another object of this invention consists in the provision in a soldering machine as mentioned of means for rigidly and firmly holding that section of the flexible conveyor at the wire feeding position only while the conveyor is stationary and the conductor wires are being fed to a group of the cells on the conveyor.

A further object of the invention resides in the provision in a machine as described of an abrasive member located at a position before the wire feeding position of the machine and arranged to clean spots on the cells at which the conductor wires will rest to be soldered.

The invention proposes many additional features and advantages too numerous to mention at this point, but they will become apparent as this specification proceeds.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure—

Fig. 1 is a perspective view of a battery cell and a conductor wire soldered thereto according to this invention. This battery cell represents the finished job.

Fig. 2 is a perspective view of the soldering machine.

Fig. 3 is a fragmentary plan view of Fig. 2.

Fig. 4 is a fragmentary front elevational view of the machine as seen in Fig. 2.

Fig. 5 is a fragmentary enlarged sectional view taken on the line 5—5 of Fig. 3.

Fig. 6 is a fragmentary sectional view taken on the line 6—6 of Fig. 5.

Fig. 7 is a sectional view taken on the line 7—7 of Fig. 6.

Fig. 8 is a sectional view taken on the line 8—8 of Fig. 5.

Fig. 9 is a transverse sectional view taken on the line 9—9 of Fig. 3.

Fig. 12 is a transverse sectional view taken on the line 12—12 of Fig. 3.

Fig. 13 is a fragmentary longitudinal sectional view taken on the line 13—13 of Fig. 12.

Fig. 14 is a fragmentary elevational view looking in the direction of the line 14—14 of Fig. 12.

Fig. 15 is a fragmentary elevational view looking in the direction of the line 15—15 of Fig. 12.

Fig. 16 is a fragmentary plan view looking in the direction of the line 16—16 of Fig. 12.

Fig. 17 is a fragmentary enlarged sectional view taken on the line 17—17 of Fig. 16.

Fig. 18 is a fragmentary enlarged sectional view taken on the line 18—18 of Fig. 3.

Fig. 19 is a sectional view taken on the line 19—19 of Fig. 3.

Fig. 20 is a transverse sectional view taken on the line 20—20 of Fig. 3.

Fig. 21 is a schematic diagram showing the timing of the various cams of the machine.

Figure 10:
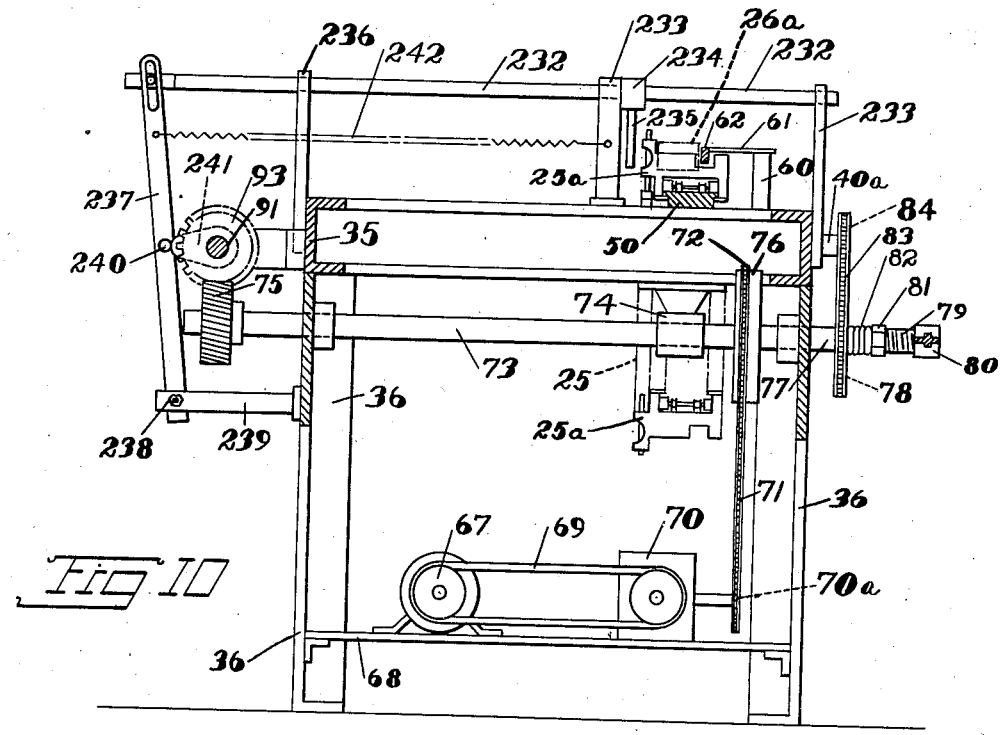
Fig. 10 is a transverse sectional view taken on the line 10—10 of Fig. 3.
Figure 11:
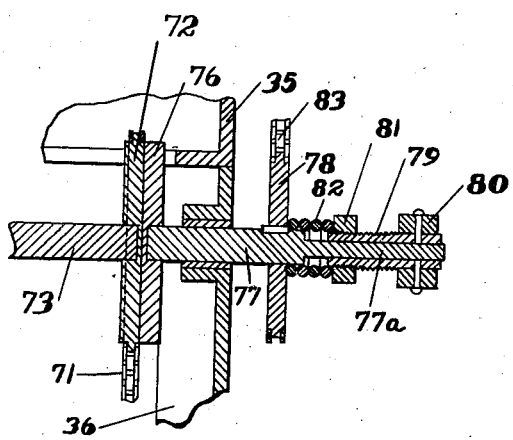
Fig. 11 is a fragmentary sectional view taken on the line 11—11 of Fig. 3.

Before going into a detailed explanation of the construction of the machine, a cursory description will be given so that one has a general idea of its operation. The soldering machine, according to this invention, includes a flexible endless conveyor 25 for holding battery cells 26 which are supplied to it by a feed chute 27. There is a means for causing this conveyor to progressively move forwards in steps of a predetermined number of battery cells. The particular machine illustrated on the drawings is designed to handle 5 battery cells at one time. Consequently the conveyor 25 is arranged to move forwards periodically in steps of 5 battery cells. A plurality of conductor wire clamps 28 are mounted on the feed conveyor 25 and are adapted to hold a conductor wire against each battery cell. There is a means for opening said wire clamps 28 along a section of the conveyor at the wire feeding position. The conductor wires are drawn from rolls of conductor wires 29, 5 in number, and simultaneously fed to the 5 battery cells at the wire feeding position. A means is provided for closing the wire clamps after the wires have been fed to their positions so as to rigidly clamp portions of the elements in proper relation to the battery cells. There is a wire cutting means which goes into operation after the wire clamps hold the 5 wires so that the wires and battery cells are now free and may move along with the endless conveyor.

At a position adjacent the wire feeding position there is a flux applying position. At this position there are 5 flux supplying fingers 30 supported on a carriage 31 arranged to reciprocate in a manner so that the 5 fingers first dip into a supply of flux and then touch the battery cells at the points at which solder is to be applied. Adjacent the flux position there is a soldering position. The solder is applied by the 5 fingers 32 which are also mounted on the carriage 31 and operated by the same mechanism. These fingers first dip into a supply of molten solder and then move over and touch the battery cells at the points at which the solder is to be applied.

After the solder applying position there is an idling position which may be of any length, determined merely by the time required for the solder to cool. After this idling position there is a position in which the clamps 28 are opened as by this time the solder is sufficiently hard not to require that the conductor wire be held in position against the cell. At this point there is also an ejector arrangement to eject the 5 finished cells, indicated by reference numeral 26a, upon a conveyor 33. This conveyor may or may not be synchronized with the operation of the machine, its fundamental object being merely to convey away the finished cells. Fig. 1 illustrates a finished cell. This cell 26a comprises a cell proper and a conductor wire 29a projecting therefrom and soldered thereon by solder 34.

The detailed description of the soldering machine is as follows: The soldering machine has a horizontal rectangular frame 35 which is supported by several legs 36. A pair of spaced standards 37 are mounted on one of the ends of the frame 35, and another pair of spaced standards 38 is mounted on the other end of the frame 35. Shafts 39 and 40 are rotatively mounted between these standards. Upon the shaft 38 there are sprocket wheels 41 (see Fig. 5) and upon the shaft 40 there are sprocket wheels 42 (see Fig. 18). Between these sprocket wheels the endless conveyor 25 is mounted. This endless conveyor is arranged so that a section of it extends across the top of the frame 35 and another section extends around the sides of the frame 35 and across its bottom (see Fig. 2).

The endless conveyor 25 is formed from a plurality of adjacent and connected identical sections 25a (see Fig. 5). Each of these sections 25a has a transverse vertical wall 43 and a connected horizontal wall 44. Consequently, each of these sections is substantially of L-shape. The battery cells 26 are adapted to rest between the adjacent vertical walls 43 of adjacent sections 25a and upon the base walls. So as to hold the cells 26 relatively stationary on the endless conveyor each of the vertical walls 43 is provided with projecting bosses 45 which act merely as stops or holding elements. At the inner ends of each of the vertical walls 43 there is a longitudinally extending head portion 46. The clamps 28 are mounted upon these head portions as hereinafter more fully described. At the inner and outer ends of the base walls 44 there are downwardly projecting flanges 47 (see Figs. 5 and 20).

Track elements 48 are attached to the bottom ends of the flanges 47 and extend towards each other and engage beneath the top flange of a track 50 which extends completely across the frame 35 from end to end (see Figs. 5 and 18). Between each of the flanges 47 of each of the conveyor sections 25 there are a pair of transverse rods 51. Rollers 52 are mounted upon these rods and engage the top of the track 50. It should therefore be understood that the top section of the endless conveyor is supported in substantially a straight line completely across the top of the frame 35. Between the adjacent rods 51 of adjacent conveyor sections 25a there are links 53 (see Fig. 5) which connect the adjacent conveyor sections 25a pivotally together. It is the rods 51 and the links 53 which cooperate with the sprocket wheels 41 for supporting and moving the endless conveyor.

At the ends the track 50 is provided with projecting lips 54 (see Figs. 5 and 18) which extend in between the sprocket wheels 41 and assist in supporting sections of the endless conveyor to positions substantially superimposed of the sprockets 41.

The feed chute 27 is supported upon one end of the frame 35 by having its lower end mounted thereon and by reason of being reinforced by a brace 55 which connects between a portion of the chute and the end of the frame 35. The chute 27 comprises several spaced transverse members 27a substantially of rectangular shape in transverse cross section connected together at the corners by angle members 27b. The outer end of the chute is open, as may be seen in Fig. 2, so that the battery cells may be supplied to it. The inner end is partially closed by longitudinally extending strips 27c so that only a small area 27d is open through which the cells may be straightened out if they happen to become jammed. A longitudinal track 27e extends substantially the entire length of the chute and is held in a predetermined fixed position by several screws 27f. This track 27e may be loosened by unscrewing same and then shifted to several different positions as permitted by the additional openings 27g in the base parts. The purpose of shifting the track 27e is to adapt the chute for battery cells of different lengths.

At the discharge end of the chute 27 there is a gate 57 which is hingedly supported by a hinge 58 along its top edge. This gate is resiliently urged closed by a spring 59 (see Fig. 2). This gate is to facilitate the proper discharge of the cells 26 into the endless conveyor without jamming. If parts start to jam the gate is forced open—or the gate may be manually opened if occasion arises. The battery cells 26 fall into the endless conveyor, as clearly shown in Fig. 5. There is also an arrangement upon the endless conveyor for aligning the battery cells and for accommodating cells of different lengths.

This means comprises several standards 60 mounted at spaced positions along the length of the frame 35 and supporting arms 61 which in turn support a longitudinally extending track 62. This track extends downwards and engages into slots 63 formed in the vertical walls 43 of the conveyor sections 25a. The arms 62 are formed with several openings 64 (see Fig. 3) which provides a selection for shifting the track 62. The track 62 extends substantially the full length of the top section of the endless conveyor, that is, from the feed chute 26 to the discharge end. At the front end there is a small spring 65 mounted upon the inside face of the track 62 and serving to press each of the cells as they enter the endless conveyor against the lugs 46. Thus, each of the cells will be firmly positioned on the endless conveyor. The track 62 terminates at the point 62a (see Fig. 3) since the remaining portion of the top section of the endless conveyor is utilized to discharge the finished cells, as hereinafter more fully explained.

The means for causing the endless conveyor to progressively move forwards in steps of a predetermined number of battery cells comprises an electric motor or other prime mover 67 mounted upon a support 68 attached upon the legs 36 of the machine. The prime mover 67 is connected by a belt or chain 69 with a speed reduction unit 70 also mounted on the support 68. The speed reduction unit 70 terminates in a gear 70a which is arranged longitudinally of the machine. A chain 71 connects with this gear and extends upwards over a gear 72 which is fixed on a shaft 73 rotatively supported in a standard 74 mounted on the frame 35. The shaft 73 extends outwards through a rear leg 36 of the machine (see Fig. 10) and at its outer end is provided with a worm gear 75. The gear 72 has a flat face with a friction surface cooperative with the friction surface of an adjacent disc 76. This disc 76 is fixed on a shaft 77 rotatively supported in a bearing mounted on one of the front feet 36 of the machine.

A gear 78 is carried on the outer end of the shaft 77. The shaft 77 has a reduced outer end 77a upon the extremity of which there is fixed a threaded bushing 79. A bracket 80 is attached on the frame 35 and fixedly is connected with the bushing 79 to support the bushing. The shaft 77, 77a is free to rotate in the bushing. A nut 81 is threadedly mounted on the threaded bushing 79 and engages against a spring 82 which engages against one face of the gear 78. This gear 78 is fixed on the shaft 77 and consequently the urging of the spring 82 is transferred to the shaft 77 and finally serves to urge the friction surfaces of the disc 76 and the gear 72 together. This is a friction drive so that rotations transmitted by the chain 71 may or may not be transmitted to the disc 76, merely depending on the load to be transferred. The shaft 73 is continuously driven by the chain 71. The gear 78 connects with a chain 83 which extends over a gear 84 mounted upon an extended end 40a of the shaft 40. Consequently, the shaft 40 is driven, which in turn by reason of the sprocket gear 42 drives the endless conveyor.

Pegs 85 project from the front face of certain of the sections of the endless conveyor 25, namely, from every fifth section. These pegs 85 are in the path of motion of a latch 86. When the latch is in its raised position it stops one of the pegs 85 and so holds the endless conveyor stationary. During this stationary period slippage takes place at the friction clutch 72, 76. The latch 86 may be momentarily lowered and raised a short period of time thereafter, sufficiently to cause rotations to be transmitted from the friction clutch 72, 76 to move the conveyor 25. The conveyor will now keep moving until the next peg 85 strikes the latch 86. Thus the conveyor is moving in steps of a predetermined number of battery cells as controlled by the latch 86.

The latch 86 is controlled by a cam 90 (see Fig. 3). This cam is fixed on a shaft 91 which is rotatively supported in standards 92 mounted on the end portions of the back side of the frame 35. The shaft 91 is provided with a worm gear 93 which meshes with the worm gear 75. Since the worm gear 75 is on the shaft 73 which is being continuously rotated the shaft 91 is continuously moving and so is the cam 90. The cam 90 is completely circular except for a small projection 90a at one side (see Fig. 21). It is this small projection 90a which operates the cam. Adjacent the cam there is a slide member 94 which comprises merely a block 94a having a hollowed out portion 94b for receiving the shaft 91 and a plate 94c mounted across the hollowed out portion 94b. The slide 94 is therefore capable of sliding a limited distance transversely of the shaft 91. A guide roller 95 is mounted upon one side of the slide 94 and engages the cam 90. Thus when the projecting portion 90a of the cam strikes the roller 95 the slide 94 will be moved frontwards.

The slide 94 is connected with a rod 96 which extends through an opening in the side of the frame 35 and connects with one end of a bell crank 97 which is supported intermediate of its ends by a pintle 98. The other end of the bell crank 97 is formed with a forked portion 99 engaging a pin 100 on the lower end of the latch 86. The latch 86 comprises merely a bolt 86a slidable in a casing 86b which is mounted upon a transverse arm 35a of the frame 35. A spring 101 connects with the bell crank 97 and with a pin mounted on the casing 86b for normally urging the bolt 86a upwards to its operative position. When the projection 90a moves the slide 94 frontwards the bell crank 97 is pivoted clockwise which draws down the bolt 86a. The projection 90a is of a sufficient size to permit the peg 85 to pass and then immediately the roller 95 rides off the projection 90a and the spring 101 returns the parts to their original position.

The clamps 28 for holding the conductor wires 29 are illustrated in detail in Figs. 13 and 14. Each clamp 28 comprises a clamp arm having a horizontal top portion 28a extending over the lug 46 and a vertical arm 28b slidably mounted within grooves 102 formed in the edge of the vertical wall 46. Pins 103 (see Figs. 8 and 14) hold the vertical arms 28b from sliding out of the grooves 102 limiting motion of the vertical arm 28b to upwards and downwards. The horizontal arm 28a is provided with a V-shaped wire clamp element 104 adapted to extend into a receiving opening 105 in the lug 46. This V-shaped element 104 in conjunction with the opening 105 is capable of clamping the conductor wire 29 tightly in position. A spring 106 is connected between one of the flanges 47 and the vertical arm 28b for normally urging the clamp into its closed position. For each conveyor section 25a there is an identical clamp as just described.

The means for opening the said wire clamps along a section of said conveyor 25 at the wire feeding position comprises a bar 107 located immediately below the ends of the vertical arms 28b of those sections of the endless conveyor immediately adjacent the wire feeding mechanism as hereinafter more fully described. This bar 107 extends beneath the clamps of 5 of the conveyor sections 25a as clearly shown in Fig. 13. The bar 107 freely rests on a pair of spaced bars 108. These spaced bars 108 extend tranversely of the track 50 and are fixedly attached to the track by several screws 109. The bar 107 has a pair of downwardly extending pegs 110 which pass through openings in the bars 108 and which project from the bottoms of these bars. The bottom ends of these pegs 110 are arranged just above a transverse rod 111 mounted on a bell crank shaped frame 112. This bell crank shaped frame comprises merely a pair of bell crank shaped spaced arms 112a which are pivotally supported intermediate of their ends by pintles 113 upon a transverse bar 114 which is supported by screws 115 to the spaced bars 108. The bar 111 is merely mounted between the same ends of the bell cranks 112. The other ends of the bell cranks 112 are connected by a bar 116 having end pegs 117 engaging in slots 118 in the arms of the bell cranks 112a. The bar 116 is supported intermediate of its ends by a standard 119 on the end of a rod 120. This rod extends out from the back side of the frame 35 and is associated with an operating cam in a particular manner.

More specifically, the bar 120 connects with a slide 121 which is slidably mounted transversely on the shaft 91. The slide 121 is urged forwards by a spring 122 acting between the slide and the frame 35. On one side of the slide 121 there is a roller 123 which engages with a clip riser cam 124. This cam is fixed on the shaft 91. It is circular through substantially the greater part of its periphery but has a projecting portion 124a which extends substantially through a 90° angular distance and is capable of forcing the slide 121 rearwards so as to move the rod 120 towards the left in Fig. 12 and so pivot the bell crank frame 112 clockwise. Then the bar 111 strikes the pins 110 and forces the bar 107 upwards so that it engages against the lower ends 28b of the 5 clamps 28 and opens the 5 clamps.

The means for rigidly and firmly holding that section of the conveyor 25 which is at the wire feeding position is operated by the cam mechanism which operates the clip riser. It consists of a longitudinally extending bar 126 which is freely supported in recessed areas of the bars 108 so as to be free to be lifted. The bar 126 has projecting pegs 127 extending through openings in the bars 108. There is a second bar 111' parallel to the bar 111 and also mounted on the bell crank frame 112. This second bar 111' is adapted to engage the pegs 127 for lifting the bar 126. The bar 126 has a plurality of resiliently supported bolts 128. Each of these bolts is urged upwards by an expansion spring 129 and is limited for disengaging from the bar 126 by a bottom nut 130. When the bar 126 is raised the bolt heads 128 resiliently engage against the bottom of the flanges 48 and force the 5 conveyor sections 25a tightly against the track 50 and so hold these 5 sections rigidly and firmly in position to receive the conductor wire. It should be noted that the cam 124 operates both the opening of the clamps 28 and the means for rigidly and firmly holding the conveyor sections at the wire feeding position.

The means for feeding the conductor wires through the open clamps 28 to positions adjacent the 5 cells which are being held is controlled by the cam 132. This cam is also mounted on the shaft 91. It operates against a roller 133 on the end of a lever 134 which is pivotally mounted at its center 135 on a bracket 136 mounted on the frame 35. The upper end of this lever 134 is formed with a slot 137 (see Fig. 12) which is engaged by a pin 138 on the end of an arm 139. This arm is slidably mounted in a bearing 140 mounted on the top of the frame 35. A rack 141 projects from the front end of the arm 139 and passes through a supporting bearing 142 mounted on a casing 143, which in turn is supported on a plate 144 mounted between one end of the frame 35 and the transverse brace 35a of the frame. The rack 141 extends completely through the bearing 142 and meshes with a gear 143' freely mounted on a shaft 144'. This shaft 144' is pivotally mounted between the side walls 143a of the casing 143.

A ratchet wheel 145 is fixed on the shaft 144 and is engaged by a pawl 146 mounted on the side of the gear 143'. Large wire feeder wheels 147 are mounted on the shaft 144. These 5 large wire feeder wheels 147 are cooperative with 5 smaller wheels 148 which are rotatively supported on the ends of 5 arms 149 which are pivotally mounted on a rod 150. The arms 149 have tail ends 151 by which they may be manually pivoted to disengage the wire feeder rollers 147 and 148. For each arm 149 there is a spring 152 which acts between the arm 149 and the casing 143 to urge the rollers 147 and 148 resiliently together. A bar 153 is mounted between the side walls 143a of the casing 143 and supports 5 guide tubes 154 for 5 strands of wire. These 5 strands of wire come from the 5 wire spools 29. These wire spools 29 are supported upon a pair of spaced arms 156. These spaced arms have numerous branches between which the rolls of wire may be supported. The wires extend downwards and are threaded through openings in a bar 157 mounted between the arms 156. The arms 156 are supported upon the frame 35. The wires from the wire rolls 29 then engage between a solid surface drum 158 and 5 grooved wheels 159. These grooved wheels are mounted on a shaft 160 supported between the arms 156. The roller 158 is supported on the free ends of a pair of end pivotally mounted arms 161 which are pivotally mounted at their upper ends by pintles 162 to the side arms 156.

The tubes 154 are in line with additional tubes 163 which extend through a bar 164 mounted on the front wall of the casing 143. The casing 143 comprises the said front wall, a bottom wall which is mounted on the plate 144, and the end walls 143a. On the front face of the front wall of the casing 143 there is fixedly mounted a plate 165 supported at its ends and slightly spaced along its center to provide a passage for a cutting blade or knife 166. On the upper end of the plate 165 there is a horizontally extending plate portion 165a above which there freely rests a bar 167. This bar 167 is formed with grooves 168 aligned with the tubes 163 for guiding and holding the wire. The bar 167 is supported upon the front arm of a frame 169. The front arm of this frame is formed with a pair of spaced openings through which bolts 170 pass. These bolts connect with the bar 167. Expansion springs 171 are arranged coaxially on the bolts 170 and resiliently urge the bar 167 downwards against the portion 165a. The frame 169 is pivotally mounted on a rod 172 which is supported in vertical arms 172a mounted on the plate 144. The frame 169 has one of its side arms formed with a rearward extending portion 169a which is pivotally connected with a link 175, in turn pivotally connected with the forward end of an arm 176 pivotally mounted by a pintle 177 supported on one of the arms 156. The rear end of the arm 176 has a wheel 178 engaging a wire release cam 179 mounted on the shaft 91.

The 5 wires 29 which are threaded through the guide tubes 154 and 163 and which engage between the wire feeding wheels 148 and 147, are fed forwards by the cam 132 pivoting the lever 134 rearwards to move the rack 141 towards the left in Fig. 12. The amount of wire fed forwards is controlled by a screw 180 which is threadedly engaged through the lever 134 and which abuts the standard 140. The normal position of the lever 134 may be controlled by adjusting the screw 180 so that the cam 132 does not immediately act against the roller 133 but requires some turning before it engages the roller to pivot the lever 134 anticlockwise. The shape of the cam 132 is egg-shaped but mounted eccentrically on the shaft 91. The arm 139 is normally urged forwards by a spring 181 acting between the arm 139 and the bearing 142.

The cutter 166 is operated by a bell crank 182. The forward end of this bell crank connects with the back side (the lower edge) of the cutter blade. The bell crank 182 is pivotally supported at the points 183 and its other end connects with a rod 184. The bell crank 182 is urged clockwise by a spring 185 which tends to normally hold the knife 166 in its lowered position. The rod 184 connects with a slide 185 mounted on the shaft 91. This slide is provided with a roller 186 (see Fig. 3) engaging a cam 187. This cam 187 is circular except that it has one side 187a projecting. When this side 187a engages the roller 186 the rod 84 is moved forwards and the motion is transmitted to move the cutter 166 upwards to simultaneously cut the 5 wires.

When the 5 wires are cut they still extend through the funnel shaped grooves 168 in the bar 167 and it is necessary that the bar 167 be lifted to free the wires. This bar is lifted indirectly by the cam 179. The cam 179 controls pivoting of the lever 176 and the frame 169 (see Fig. 20) which will lift up the front end of the frame to its open position as shown in Fig. 20 when the operating portion of the cam 179 engages the roller 178.

At the front of the wire feeding position there is an abrasive member 190 supported on an arm 191 supported on a post 192, which in turn is supported on the plate 144.

The means for applying soldering flux and solder to spots on the battery cells may be understood from the following: There are 5 flux fingers 30 which are supported by a brace 193 mounted on the frame 31. These fingers freely extend through openings in the brace 193 and have enlarged heads 30a so that they freely rest on the brace 193. The frame 31 is substantially of rectangular shape and has two openings—the opening 194 and the opening 195—both adjacent each other. Through the opening 194 the flux fingers 30 project downwards and are adapted to engage into a flux holding tray 196 supported by posts 197 (see Fig. 9) upon portions of the frame 35. The solder fingers 32 are freely supported in a transverse brace 198 mounted on the frame 31. The solder fingers extend through the opening 195 and are adapted to engage into a solder holding tray 199. The solder fingers 32 are freely mounted through the brace 198 and at its ends have enlarged heads 32a so that they may freely rest upon the brace 198.

A weighting means is provided to apply proper pressure to the solder fingers. This weighting means comprises a pair of spaced posts 200 mounted on the frame 31 and supporting a rod 201 upon which there are pivotally mounted 5 arms 202. Each of these arms engage over one of the upper ends of the soldering fingers 32. Weights 203 are mounted upon the free ends of the arms 201 in order to supply the pressure required. These weights may be shifted along the arms for varying the pressure until the correct pressure is obtained.

The frame 31 is supported at its rear by a pair of rollers 204 which engage tracks 205 supported on brackets 206 mounted on the frame 35. These brackets 206 are of angle shape having horizontal top portions upon which the tracks 205 are mounted and vertical side portions which extend downwards and are attached to the frame 35. The frame 31 is supported at the front by a bar 207 which extends forwards from its central part. This bar 207 rests upon a roller 208 rotatively mounted on the upper end of a bell crank 209 which is pivotally supported at its center by a pintle 210 mounted on a standard 211. The lower end of the bell crank 209 connects with a rod 212 which extends through both the front wall and the rear wall of the frame 35. This rod connects with a slide 213 (see Fig. 3) slidably arranged on the shaft 91. A roller 214 engages a cam 215 mounted on the shaft 91. This cam is of the shape clearly shown in Fig. 21 comprising a central substantially circular portion 215a and a pair of oppositely directed arms 215b. The arrangement is such that for each rotation of the shaft 91 the cam 215 will twice move the arm 212 forwards and rearwards which pivots the bell crank 209 so that its top (the roller supported end 208) moves upwards and downwards to raise and lower the front of the frame 31.

The frame 31 is moved forwards and rearwards by a pair of arms 217 which are pivotally connected at spaced positions to the rear face of the frame 31. These arms 217 each connect with a lever 218. Each of these levers are pivotally supported by pintles 219 intermediate of their ends on standards 220 mounted on the frame 35. The lower ends of the levers 218 are provided with rollers 221 (see Fig. 21) engaging cam grooves 222a. These cam grooves are in cams 222 fixed on the shaft 91. There must be suitable heat for keeping the solder in the solder container 199 molten. This heat may be supplied by suitable gas burners. One type of gas burner is shown in Fig. 9. In this figure there is a gas burner 224 receiving a supply of gas from the pipe 225, and adapted to shoot flames against the solder container.

The flux supply fingers 30 are arranged at positions immediately adjacent the wire feeding position. The solder supplying fingers 32 are arranged in positions immediately adjacent the flux supplying fingers. Both the solder and flux supplying fingers are formed in a manner so that the solder and flux will adhere to them. The action of the fingers consists in alternately dipping into the supply of flux and solder and then touching spots on the battery cells.

The ejector of the finished cells comprises a longitudinally extending bar 230 which is supported by a rod 231 and another rod 232 mounted on the ends thereon. These rods pass through vertical posts 233 mounted on a brace 234 supported from the frame 35. The bar 230 has 5 downward depending fingers 235 which extend downwards and which are adapted to engage against the rear ends of the battery cells on the conveyor and force them forwards off the conveyor. The rod 232 has a rear post support 236.

Its rear end is pivotally and slidably connected with a lever 237 which is pivotally mounted at its bottom end by a pintle 238 supported on a standard 239. Intermediate of its ends the lever 237 has a roller 240 which engages a cam 241 mounted on the shaft 91. A spring 242 acts between the lever 237 and the post 233 for normally urging the rod 232 forward. The cam 241 controls the forward motion of the rod 233. When the rod moves forwards the fingers 235 eject the 5 battery cells on to another conveyor 33. This conveyor 33 comprises an endless belt engaging a rotatively supported drum 245 rotatively mounted on the bracket 38. There is a second roller 246 which is rotatively supported by arms 247 mounted on the frame 35. The conveyor 33 extends away to some point (not shown on the drawings) to deliver the finished batteries. Between the rolls 245 and 246 there is a support plate 248 the purpose of which is to prevent the endless conveyor 33 from sagging at this area. This is the area upon which the finished cells 26 are discharged.

Before the finished cells are discharged mechanism is necessary for opening the clamps 28 to release the cells. This mechanism comprises merely a stationary cam 250 (see Fig. 19). This cam is merely in the form of a rod having a curved end 250a against which the lower ends of the clamps 28 may engage to cause the clamps to open (see Fig. 19). This cam 250 extends over to and meets the top of a wheel 251 mounted on the shaft 40a. This wheel 251 comprises a continuation of the cam 250 to maintain the clamps 28 in their open position until after they have passed around the end of the conveyor. This is to insure that the finished cells are properly removed. Should a cell not be removed there is an opportunity to remove it before the clamp 28 closes.

The operation of the device is as follows:

The operation may be best understood by carefully considering Fig. 21 which illustrates the essential cams in their correct timed positions. Rotations from the motor 67 are transmitted to the chain 71, to the wheel 72, to the shaft 73, and then through the worm gears 75 and 93 to the shaft 91. The contact between the faces of the disc 76 and the gear 72 is frictional so that rotations may also be transmitted from the shaft 73 to the shaft 77 if the frictional resistance is not too great. The frictional drive may be controlled by adjusting the nut 81. The frictional resistance is controlled by the bolt 86 acting against one of the pegs 85 of the endless conveyor. When the bolt 86 is in its raised position the endless conveyor is held so that it cannot move, and then slippage takes place at the friction clutch 72, 76.

The battery cells are stacked in the feed chute 27 and they extend downwards to the endless conveyor as shown in Fig. 5. From this position the first thing that takes place during the operation of the machine is that the cam projection 90a of the cam 90 engages against the roller 95 moving the rod 96 forwards and pivoting the bell crank 97 and moving the bolt 86a downwards to open the latch 86. Instantly rotations are transmitted from the shaft 73 to the shaft 77 so that the gear 78 turns, the chain 83 is moved, and indirectly the shaft 40 rotates. This rotation is transmitted to move the endless conveyor 25 clockwise. An instant later the projection 90a rides free of the roller 95 so that the spring 101 returns the latch 86 to its initial position. The conveyor continues its forward motion until the next peg 85 strikes the latch 86 and then it comes to rest. During this period the battery cells 26 were feeding into the endless conveyor and now there are 5 battery cells 26 located at the wire feeding position of the machine, that is, a position immediately to the front of the 5 cells or wire feed rollers 147, 148.

The shaft 91 now turns clockwise for a distance of approximately 45°, during which period the conveyor comes to rest. Then the projection 124a of the cam 124 engages the roller 123 and indirectly causes the 5 clips on the endless conveyor at the wire feeding position to pen, and simultaneously rigidly holds the 5 sections of the endless conveyor at this position. This operation may be traced in Fig. 12. The roller 123 will cause the rod 120 to move rearwards, which in turn will pivot the bell crank frame 112 so that the bars 111 and 111' force the pegs 110 and 127 upwards. This raises the bar 107 which engages the arms 28b of the wire clamps to open the clamps. This also raises the bar 126 which causes the resiliently supported headed bolts 128 to engage the tracks 48 and force the 5 conveyor sections 25a tightly against the track 50.

The cam 124 will stay in operation for a period of about 90° of rotation of the shaft 91. During this period the wire feeder cam 132 goes into operation. The operation consists in the cam 132 engaging the roller 133 to pivot the lever 134 and move the bar 139 and the rack 141 rearwards. The rack 141 turns the gear 143' clockwise and this motion is transmitted to the ratchet 145 to turn the shaft 144' clockwise. This causes the wire feeding wheels 147 to turn clockwise and feed the wires 29 forward, the distance depending upon the initial position of the roller 133 which may be controlled by the screw 180. When the cam 132 permits the roller 133 to seek its original position the wires 29 will not be affected as then the ratchet 146 merely idles over the ratchet wheel 145.

The wire cutting cam 187 now goes into operation. By this time the shaft will have turned approximately 180°. The projecting portion 187a engages the roller 186 to move the rod 184 forwards, to pivot the bell crank 182, and to move the cutter 165 upwards. The 5 wires are cut between the bars 164 and 167.

After the wires are cut and the shaft has turned approximately 270° the wire release cam 179 goes into operation. This cam engages the roller 178 which operates the levers 176, the frame 169, to lift the bar 167 so that the wires which have been fed forwards to the 5 cells are free from the funnels 168. It should be noted that after approximately a turn of slightly less than 180° of the shaft 91 the cam 124 will operate to permit the clamps 28 to grip the wires that have been fed forwards. This gripping operation takes place immediately before the wire cutting cam 187 goes into operation. It should be noted that the 5 short lengths of wire are now being held adjacent the 5 battery cells. Upon completion of the 360° rotation of the shaft 91 the carriage stop cam 90 will act to release the latch 86 so that the carriage moves forwards. It is during this forward motion of the carriage that the wire release cam 179 is still in operation so that all of the battery cells with the newly fed wires are moved out from the wire feeding position. After they are moved out from this position the wire feeding cam 179 causes the return of the bar 167 to its original position, and thus prior to the operation of the wire feeder cam 132. The parts are now in position for new wire to be fed to the new cells.

During the 360° rotation of the shaft 91 the cams 222, 215 and 241 are caused to operate to cause different portions of the machine to function. This operation is entirely independent of the operation of the cams 90, 124, 132, 187 and 179, except for the fact that this operation must take place during that period in which the conveyor is stationary.

The cams 222 and 215 operate simultaneously. The cams 222 act to move the frame 31 forwards and rearwards during one turn of the shaft 91. During this forward and rearward motion the cam 215 acts to tip the front end of the frame 31 downwards at the beginning and at the end of the forward and rearward motion of the frame. In the downward position of the frame 31 at the start of the operation the 5 flux fingers 30 are dipping into the flux in the container 196. At this period the 5 soldering fingers 32 are dipping into the container 199. The cam 215 is a rapid acting cam, while the cam 222 is a slow acting cam. The cam 215 cooperates with the roller 214 to move the rod 212 to pivot the bell crank 209 and to lift the front end of the frame 31 upwards. Then the cams 202 cooperate with the rollers 221 on the levers 218 which are connected with the links 217 to move the frame 31 forwards. It should be noted that the flux fingers 31 and the solder fingers 32 are so lifted over the front edge of the flux container and the solder container. When the frame 31 reaches its forward position the cam 215 acts again, but this time to lower the front end of the frame 31 so that the 5 flux fingers 30 and the 5 solder carrying fingers 32 each engage 5 cells.

The first group of 5 cells receive the flux treatment, the 5 flux fingers dropping 5 drops of flux on the ends of the cut wires 29 on the 5 battery cells 26 which are in the endless conveyor 25 adjacent this position. Simultaneously, the 5 soldering conveying fingers 32 are dropping 5 drops of solder on the ends of the cutter wires 29 on 5 cells in the endless conveyor 25 which are adjacent this soldering position. It should be remembered that both in the flux applying position and in the soldering positions the cut wires 29a are being firmly held by the clamps 28 in position relative to the cells 26a.

Between the soldering position of the endless conveyor and the ejection position of the finished cells there is an area in which the solder is permitted to cool. The ejector cam 241 operates during the period that the endless conveyor is stationary. It operates by engaging the roller 240 on the lever 237 which operates the ejector rod 232, the rod 230 and the ejector fingers 235. These fingers pass in between the sections 25a of the endless conveyor (see Fig. 4) and push the finished cells on to the conveyor 33. At the ejecting position the clamps 28 are opened because of the cam 250 (see Fig. 19).

The operation of the machine is continuous with the battery cells being delivered to the machine by the feed chute 26 and the finished cells being delivered on the conveyor 233.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:

1. In a soldering machine, a flexible endless conveyor, means for holding battery cells and the like on said conveyor in predetermined relative fixed positions, and a plurality of conductor wire clamps on said conveyor for holding a conductor wire against each battery cell on said conveyor in a relatively fixed position, each of said clamps having a movable member by which the clamp may be opened, and means external of and stationary relative to said conveyor for moving said member of each clamp to open the clamp so that the clamp may receive said conductor wire, said endless conveyor comprising a plurality of L-shaped sections transversely adjacent each other and pivotally connected with links and adapted to receive the battery cells transversely between adjacent vertical arms of the L-shapes and on the horizontal arms and each of said clamps being on one of said sections arranged so that said movable member projects therefrom to be in the path of said latter means during the motion of the endless conveyor.

2. In a soldering machine, a flexible endless conveyor for battery cells and the like, and a plurality of conductor wire clamps on said conveyor for holding a conductor wire against each battery cell on said conveyor, each of said endless conveyors comprising a plurality of L-shaped sections transversely adjacent each other and pivotally connected with links and adapted to receive the battery cells transversely between adjacent vertical arms of the L-shapes and on the horizontal arms, each of said L-shaped conveyor sections having side flanges, a track beneath a section of said endless conveyor, tracks mounted on said side flanges and engaging upon said track, said clamps comprising an inverted L-shaped member the top arm of which is adapted to clamp the conductor wire against a portion of said L-shaped section, the vertical arm of which is slidably mounted on said L-shaped section, and resilient means for urging said clamp closed.

3. In a soldering machine, a flexible endless conveyor, means for holding battery cells and the like on said conveyor in predetermined relative fixed positions, a plurality of conductor wire clamps on said conveyor for holding a conductor wire against each battery cell on said conveyor in a relatively fixed position, each of said clamps having a movable member by which the clamp may be opened, and means external of and stationary relative to said conveyor for moving said member of each clamp to open the clamp so that the clamp may receive said conductor wire, and said means for opening said wire clamps being along a section of said conveyor to comprise a wire feeding position for conductor wires to the clamps, said means for opening the clamps comprising a linkage system one end of which is adapted to engage against the movable member of the clamps for opening same, and a cam for controlling the other end of the linkage system.

4. In a soldering machine, a flexible endless conveyor, means for holding battery cells and the like on said conveyor in predetermined relative fixed positions, a plurality of conductor wire clamps on said conveyor for holding a conductor wire against each battery cell on said conveyor in a relatively fixed position, each of said clamps having a movable member by which the clamp may be opened, and means external of and stationary relative to said conveyor for moving said member of each clamp to open the clamp so that the clamp may receive said conductor wire, said means for opening said wire clamps being along a section of said conveyor at a wire feeding position, means for feeding conductor wires through said open clamps and adjacent said battery cells, and means for returning said members to their initial positions for closing said open clamps for holding said wires in position on said conveyor and against said battery cells, and means for cutting said clamped wires to a desired length.

5. In a soldering machine, a flexible endless conveyor, means for holding battery cells and the like on said conveyor in predetermined relative fixed positions, a plurality of conductor wire clamps on said conveyor for holding a conductor wire against each battery cell on said conveyor in a relatively fixed position, each of said clamps having a movable member by which the clamp may be opened, and means external of and stationary relative to said conveyor for moving said member of each clamp to open the clamp so that the clamp may receive said conductor wire, said means for opening said wire clamps being along a section of said conveyor at a wire feeding position, means for feeding conductor wires through said open clamps and adjacent said battery cells, and means for returning said members to their initial positions for closing said open clamps for holding said wires in position on said conveyor and against said battery cells, and means for cutting said clamped wires to a desired length, comprising a cutter blade for the wires, and means for moving said cutter blade.

6. A soldering machine comprising a flexible endless conveyor for holding battery cells or the like, means for causing said conveyor to progressively move forwards in steps of a predetermined number of battery cells, a plurality of conductor wire clamps on said conveyor for holding a conductor wire against each battery cell, each of said clamps having a movable member by which the clamp may be opened, and means external of and stationary relative to said conveyor for moving said member, of each clamp to open the clamp for receiving said conductor wire, and said means for opening said wire clamps being along a section of said conveyor at a wire feeding position, means for feeding conductor wires through said opened clamps and adjacent said battery cell while the conveyor is stationary, means for cutting said clamped wires to a desired length, means for applying soldering flux to spots on said conductor wires and battery cells, means for applying solder to said spots, and means for opening said clamps after said solder has hardened.

7. A soldering machine comprising a flexible endless conveyor for holding battery cells or the like, means for causing said conveyor to progressively move forwards in steps of a predetermined number of battery cells, a plurality of conductor wire clamps on said conveyor for holding a conductor wire against each battery cell, each of said clamps having a movable member by which the clamp may be opened, and means external of and stationary relative to said conveyor for moving said member, of each clamp to open the clamp for receiving said conductor wire, and said means for opening said wire clamps being along a section of said conveyor at a wire feeding position, means for feeding conductor wires through said opened clamps and adjacent said battery cell while the conveyor is stationary, means for cutting said clamped wires to a desired length, means for applying soldering flux to spots on said conductor wires and battery cells, means for applying solder to said spots, means for opening said clamps after said solder has hardened, and means for rigidly holding that section of the conveyor at the wire feeding position only while said conveyor is stationary.

8. A soldering machine comprising a flexible endless conveyor for holding battery cells or the like, means for causing said conveyor to progressively move forwards in steps of a predetermined number of battery cells, a plurality of conductor wire clamps on said conveyor for holding a conductor wire against each battery cell, each of said clamps having a movable member by which the clamp may be opened, and means external of and stationary relative to said conveyor for moving said member, of each clamp to open the clamp for receiving said conductor wire, and said means for opening said wire clamps being along a section of said conveyor at a wire feeding position, means for feeding conductor wires through said opened clamps and adjacent said battery cell while the conveyor is stationary, means for cutting said clamped wires to a desired length, means for applying soldering flux to spots on said conductor wires and battery cells, means for applying solder to said spots, means for opening said clamps after said solder has hardened, and an abrasive member at a position before said wire feeding position for cleaning spots on said cells at which said conductor wires will rest.

9. In a soldering machine, a conveyor for holding battery cells, means for causing said conveyor to progressively move forwards in steps of a predetermined number of battery cells, a plurality of conductor wire clamps on said conveyor for holding a conductor wire against each cell, a container of flux and a container of molten solder, fingers for engaging in said flux and other fingers for engaging in said solder, means for periodically moving said fingers from said flux and said solder to touch against areas of said conductor wires and cells, and means for opening said clamps located at a position along said endless conveyor past said solder applying position and sufficiently spaced therefrom to permit the applied solder to become cool and sufficiently hard to be capable of holding the conductor wire soldered to the cell without the necessity of a clamp to hold the conductor wire rigidly in position.

10. In a soldering machine, a conveyor for holding battery cells, means for causing said conveyor to progressively move forwards in steps of a predetermined number of battery cells, a plurality of conductor wire clamps on said conveyor for holding a conductor wire against each cell, a container of flux and a container of molten solder, fingers for engaging in said flux and other fingers for engaging in said solder, means for periodically moving said fingers from said flux and said solder to touch against areas of said conductor wires and cells, means for opening said clamps located at a position along said endless conveyor past said solder applying position and sufficiently spaced therefrom to permit the applied solder to become cool and sufficiently hard to be capable of holding the conductor wire soldered to the cell without the necessity of a clamp to hold the conductor wire rigidly in position, and means for ejecting the cells with the conductor wires soldered to them from said endless conveyor subsequent to the time that said wire clamps are opened.

ALFRED SCHMIDT.